United States Patent [19]

Kirner et al.

[11] 4,257,031

[45] Mar. 17, 1981

[54] DIGITAL REMOTE CONTROL SYSTEM

[75] Inventors: Ernest O. Kirner, Coral Springs; Walter L. Devensky, Boca Raton, both of Fla.

[73] Assignee: The Bendix Corporation, Southfield, Mich.

[21] Appl. No.: 58,572

[22] Filed: Jul. 18, 1979

[51] Int. Cl.[3] ........................ H04Q 9/00; G08B 23/00

[52] U.S. Cl. ................................ 340/149 R; 340/505; 340/147 MD

[58] Field of Search ................ 340/149 R, 168 S, 163, 340/167 R, 147 R, 574, 505, 164 R, 147 MD

[56] References Cited

U.S. PATENT DOCUMENTS

| | | | |
|---|---|---|---|
| 3,577,187 | 5/1971 | Benson | 340/167 R |
| 3,689,887 | 9/1972 | La Falce et al. | 340/163 |
| 4,044,351 | 8/1977 | Everson | 340/514 |
| 4,086,569 | 4/1978 | Pitches et al. | 340/167 R |
| 4,155,073 | 5/1979 | Ulch et al. | 340/147 R |

*Primary Examiner*—Donald J. Yusko
*Attorney, Agent, or Firm*—W. G. Christoforo; Bruce L. Lamb

[57] ABSTRACT

First and second redundant command signals are formulated in parallel-by-bit digital format by two ganged wafer switch sets in a control unit. The first redundant command signal is stored in a shift register and subsequently strobed out, by clock pulses received from a remote unit, and transmitted to the remote unit in serial-by-bit format where it is stored and used to control the remote unit. The command signal is subsequently clocked out of the remote unit and returned to the control unit in serial-by-bit format where it is compared against the second redundant command signal to insure that the remote unit has responded to the proper command.

A renewable timer is reset by the clock pulses. If the clock pulses are interrupted for more than a predetermined time the renewable timer times out and indicates a fault.

13 Claims, 2 Drawing Figures

DIGITAL REMOTE CONTROL SYSTEM

FIELD OF THE INVENTION

This invention relates to means for controlling electronic equipment which is remotely located from the point of control and in particular to such means which operate on digital principles and are failsafe.

BACKGROUND OF THE INVENTION

In order to overcome space limitations in control points or rooms which might otherwise have a high equipment to space ratio such as the cockpits of commercial and heavy general aviation aircraft, electronic instruments normally have control units and readouts located at the control point, for example, on the cockpit instrument panel, and the body of the instrument located in remote radio racks. Not only does this arrangement overcome the aforementioned control point space limitations but it also facilitates maintenance of the equipment by making the body of the equipment easily accessible at the remote location.

The control of remote equipment from a centralized control point presents some special requirements, especially in aircraft applications. Specifically:

1. The control system must use a minimum of interconnecting cable in order to reduce the weight and the cost of the interconnection.
2. The reliability and integrity of the control system must be high.
3. The time delay introduced by the control system must be short.
4. The control system must be failsafe.

The first three of the above requirements are readily satisfied by serial digital remote control systems. Types of these digital remote control systems are well known in the prior art. The last requirement, that the control system be failsafe can be, and has been, in the prior art, met by any one of the following three means and methods.

According to the first of these methods, an audible identification signal (voice or Morse code) is transmitted, by a ground based facility in the case of aircraft applications. When the system operator hears the correct identification he is assured that the remote unit is actually tuned to the desired channel or mode of operation and that his control system is operating properly. If the identification signal is lost or otherwise no longer heard by the system operator, he knows that a fault has occurred and the instrument is no longer reliably operable. This method is used in VORTAC and ILS systems. Unfortunately, this method increases the operator workload, especially when a Morse code identification signal is used.

According to the second method, the remote unit generates a code signal in response to a control signal received from the control unit. The code signal is transmitted via the control system back to the control unit. The code signal energizes a special display at the control point thereby visually identifying the control signal and verifying for the operator that the remote unit and the control system are operating properly. The cost of implementing this method is relatively high and the reliability and integrity of the control point display introduce other problems.

SUMMARY OF THE INVENTION

According to the third method the remote unit generates a code signal (a so-called "ECHO") in response to a control or command signal received from the control unit as was done according to the second method described above. Here, however, the ECHO is compared electronically in the control unit with the original control signal. Any discrepancy between the two signals activates a warning device or otherwise indicates a fault in the system. Implementation of this third method comprises the means of the present invention. In addition, since switch malfunction is relatively common and contributes heavily to control system failure, the preferred embodiment of the invention uses redundant control switches.

It is an object of this invention to provide a failsafe control system for equipment remotely located from a control point or unit.

DESCRIPTION OF THE PREFERRED EMBODIMENT

Figure 1:
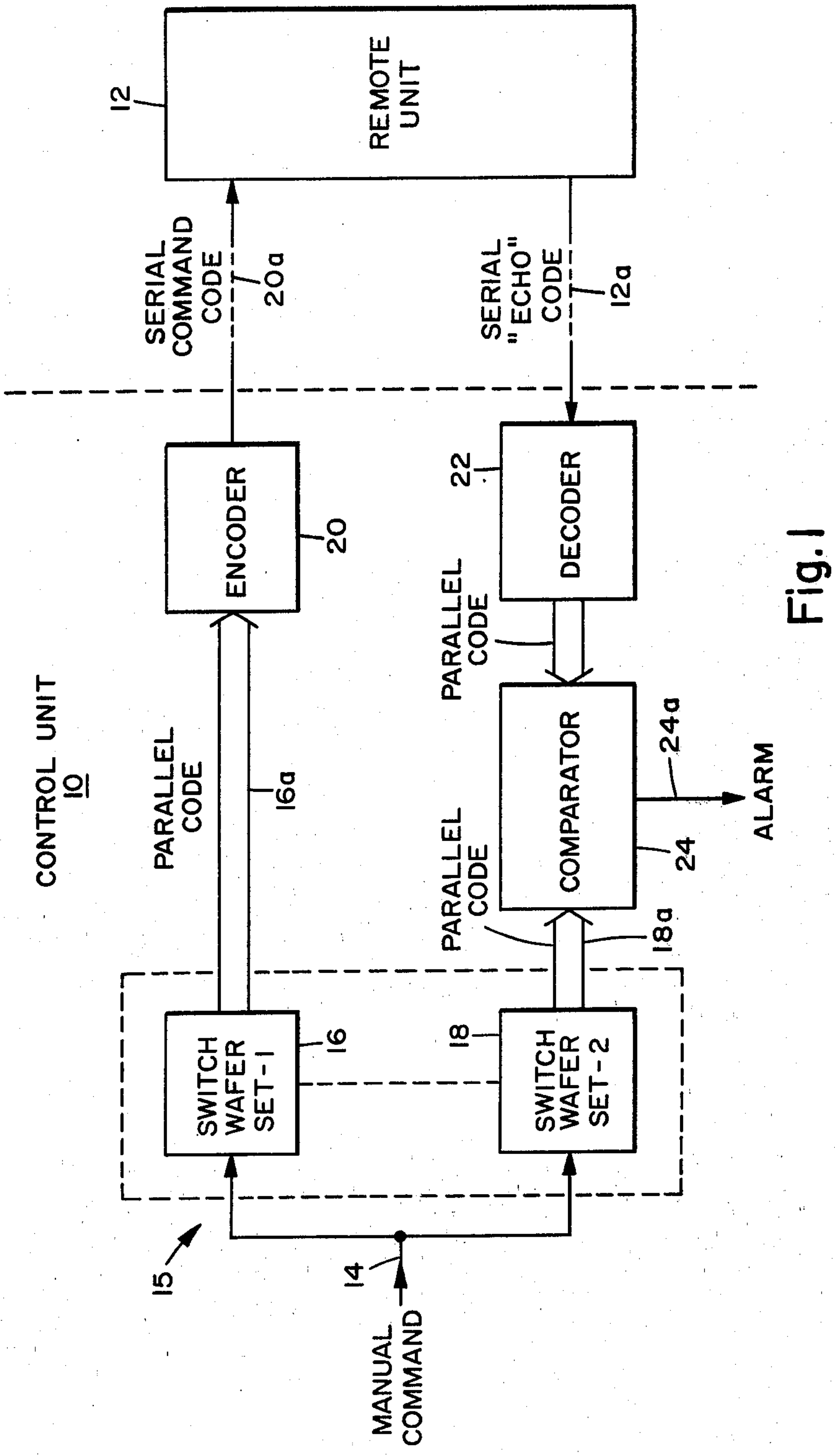
FIG. 1 is a block diagram of the invention.

Referring first to FIG. 1, a control unit 10 controls the operation of a remote unit 12 by transmitting a control or command signal to the remote unit 12 via cable 20*a*. In response to the received command signal remote unit 12 alters its tuning or mode of operation, generating a response "ECHO" code identifying its new state or condition and transmits the "ECHO" code back to control unit 10 via cable 12*a*. More particularly, control unit 10 is comprised of a switch means 15, normally a stack of switch wafers of the type known to those skilled in the art. The switch wafers are preferably divided into two redundant sets 16 and 18 which are manipulated simultaneously, usually manually by the system operator. In response to a command set into the switch wafers by the system operator, each switch wafer set generates a code, which in this embodiment are parallel-by-bit digital codes which are identical to one another, these parallel-by-bit digital codes being generated on lines 16*a* and 18*a* respectively. The code on lines 16*a* is applied to an encoder 20 which in response thereto generates a corresponding serial-by-bit command code which is transmitted via line 20*a* to remote unit 12. It is preferable, especially in aircraft applications to transmit the command code from the control unit to the remote unit in serial-by-bit code so that only a single wire or line 20*a* is needed thus saving material and weight. For the same reasons the "ECHO" code generated by remote unit 12 and transmitted via line 12*a* to control unit 10 is a serial-by-bit code, thus requiring the "ECHO" code to be decoded in a decoder 22 for conversion to an equivalent parallel-by-bit code which is compared by comparator 24 against the code from wafer set 18. In the event the two inputs thereto do not compare favorably, comparator 24*a* generates an output on line 24*a* which is used to generate an alarm.

It can be seen that the use of redundant switch wafer sets 16 and 18 is particularly effective in guarding against undetected control system faults. For example, assume only a single wafer set were used and the code output therefrom was applied to encoder 20 and comparator 24. In the event a fault occurred in the switch it is possible and likely that a recognizable but false command code would be transmitted to remote unit 12 which would accordingly obey the command and return the appropriate "ECHO" to control unit 10 and no alarm would be provided in spite of the fact that the remote unit response was not in accordance with the intended command since the command was altered at the switch. However, according to the present control system it is highly unlikely that both switch wafers would fail simultaneously and almost impossible that the specific failure would be identical in both wafer sets. Thus, where the response of remote unit 12 is not in accordance with the command set into switch 15 an alarm is invariably provided.

Figure 2:
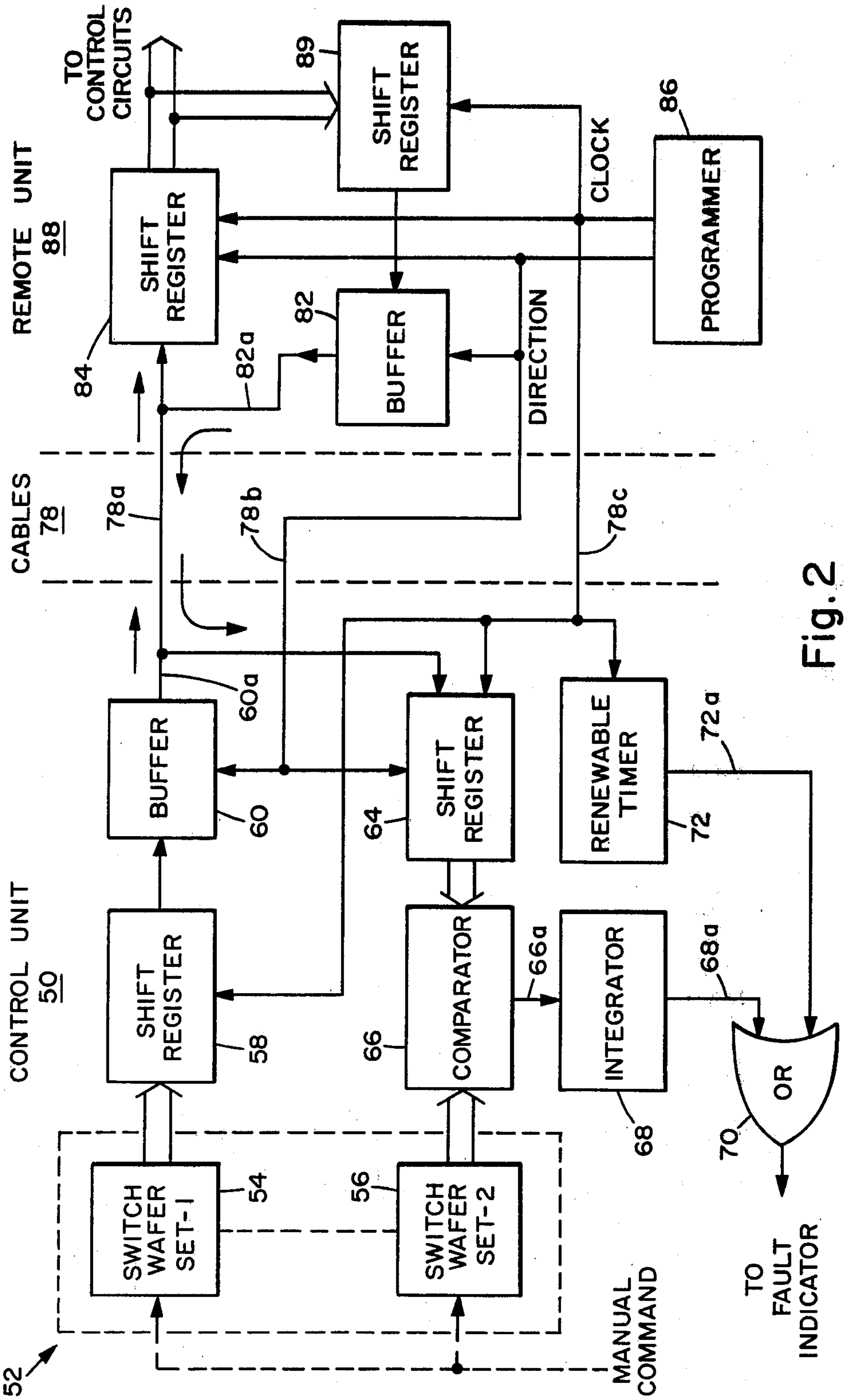
FIG. 2 is a block diagram which shows the invention in greater detail.

Referring now to FIG. 2 which shows the invention in greater detail, a control unit 50, mounted at the control point, is comprised of a switch 52, shift registers 58 and 64, buffer 60, comparator 66, integrator 68, OR gate 70 and timer 72. Switch 52 is similar or identical to switch 15 of FIG. 1 in that it is comprised of redundant wafer sets 54 and 56. The command set into wafer set 54 is applied in parallel bit format into shift register 58. The redundant command set into wafer set 56 is applied to comparator 66.

Control unit 50 is connected to remote unit 88 via interconnecting cables 78, which are comprised of lines 78*a*, 78*b* and 78*c*. Remote unit 88 is comprised of buffer 82, shift registers 84 and 89, programmer 86 and, of course, the control circuits and other circuits of the particular equipment involved. For clarity, these latter circuits are not shown. Programmer 86 periodically generates bursts of clock pulses which are applied simultaneously to shift registers 84 and 89 in remote unit 88 and shift registers 58 and 64 in control unit 50. Each shift register is the same length and there are the same number of clock pulses in each burst as there are shift register stages in a shift register. Programmer 86, at the same time it generates a burst of clock pulses also generates a direction signal of either a first or second state. As will be explained below, the direction signal when in the first state conditions the circuit elements to transmit signals from the control unit to the remote unit. This state is also called the control unit transmit state. The direction signal when in the second state conditions the circuit elements to receive signals at the control unit which are transmitted from the remote unit. This state is also called the control unit receive state. The direction signal is applied to shift register 84 and buffer 82 of remote unit 88 and via line 78*b* to shift register 64 and buffer 60 of control unit 50. When in a control unit transmit or first state, the direction signal isolates shift register 64 from receiving data and conditions shift register 84 to receive data from buffer 60. In a control unit receive or second state, the direction signal isolates shift register 84 from receiving data and conditions shift register 64 to receive the "ECHO" check data from buffer 82. It should be noted that buffers 60 and 82 are three state devices such as the buffer made by Texas Instruments, Inc. and designated as SN 74LS126N. The buffers can drive line 78*a* into a high or low state or switch to a high impedance output to permit the other buffer to control the line. These buffers eliminate the need for a dedicated return line to perform the "ECHO" check. The aforementioned high impedance output is particularly important as this feature insures that buffer 82 does not load line 78*a* when buffer 60 is transmitting and buffer 60 does not load the line when buffer 82 is transmitting.

Returning to a description of the operation of the invention, when the direction signal is in the first or control unit transmit state, as mentioned above, the burst of clock pulses on line 78*c* causes the digitally encoded command signal in shift register 58 to be strobed out in serial format through buffer 60 onto line 78*a* into shift register 84. Thus, the command set into switch wafer set 54 is now stored in shift register 84 in the remote unit. The command signal is applied from shift register 84 to the remote unit control circuits to effect control of the equipment. The command signal is also applied to and stored in shift register 89.

Subsequently the direction signal generated by programmer 86 goes to the second or control unit receive state. This causes buffer 60 to become inactivated, that is, it will not drive line 78*a* when clock pulses are applied to shift register 58. The direction signal while in this state activates buffer 82 to control line 78*a*. It also inactivates shift register 84 so that it does not respond to clock signals applied thereto. Thus, in response to the burst of clock pulses generated by programmer 86 when the direction signal is in the second or control unit receive state, the contents of shift register 89 are strobed out through buffer 82 onto line 78*a* and into shift register 64. A control cycle is thus completed with the "ECHO" signal from remote unit 88 now in shift register 64 being compared by comparator 66 with the command signal in wafer set 56.

If at any time the comparison is unfavorable comparator 66 generates an output on line 66*a*. Of course, during the short time that signals are being strobed into shift register 64 and until the shift register has been fully loaded, an unfavorable comparison will result. For that reason, the signal on line 66*a* is integrated by integrator 68 which generates an output on line 68*a* only if an unfavorable comparison persists for a time period in excess of the time required for the system to return "ECHO" signal to shift register 64.

The fault signal on line 68*a* is applied through OR gate 70 to some utilization device such as a fault indicator.

Another fault mode can occur with the system of FIG. 2 which would prevent remote unit 88 from following the manual commands entered into switch 52, but which might go undetected. Specifically, if the clock pulses fail no information is interchanged between the various shift registers but no fault is signaled since the contents of both shift registers were equal when the clock failed. To guard against such an undetected fault a renewable timer 72 is provided. Timer 72 is continually reset by the burst of clock pulses on line 78*c*. If timer 72 times out in between clock bursts it generates an output on line 72*a* which is applied through OR gate 70 as a fault signal. Thus, so long as there are bursts of clock pulses at the correct intervals on line 78*b*, timer 72 cannot time out and no fault is indicated thereby.

From this description of the embodiments of our invention one skilled in the art should now be able to design embodiments which, although having various alterations and modifications, would still fall within the true spirit and scope of our invention. Accordingly, the property encompassed hereby is to be limited only by the appended claims.

The invention claimed is:

1. A digital system for controlling a remote unit from a control point in accordance with a command, comprising:

encoder means having at least first and second redundant and simultaneously manipulated encoders for reducing said command to first and second identical digital signals respectively in said first and second encoders;

means for transmitting said first digital signal in serial-by-bit format to said remote unit;

means for receiving and storing said first digital signal at said remote unit, said first digital signal being used to control said remote unit;

means for transmitting the first digital signal back from said remote unit to said control point;

means for receiving said first digital signal at said control point; and, means for comparing said second digital signal with the digital signal received at said control point, an unfavorable comparison indicating a fault or failure in said digital system.

2. The digital system of claim 1 wherein said encoder means comprises switch means and said first and second encoders comprise first and second sets of switch wafers.

3. A system for controlling a remote unit from a control unit in accordance with a command comprising:

encoder means having first and second redundant and simultaneously manipulated encoders for converting said command to first and second identical parallel-by-bit signals in said first and second encoders respectively;

first means for storing a copy of said first parallel-by-bit signal at said control unit;

second means for storing a copy of said parallel-by-bit signal at said remote unit;

means for transmitting said copy from said first means to said second means in serial-by-bit format in response to a direction signal when of a first sense, whereby said copy is stored in said second means, said remote unit being controlled by the signal in said second means;

means for generating said direction signal alternately in said first sense and then in a second sense;

third means for storing a copy of said parallel-by-bit signal at said control unit;

means for transmitting said copy from said second means to said third means in serial-by-bit format in response to said direction signal when of a second sense whereby said copy is stored in said third means; and, means comparing the contents of said third means with the second parallel-by-bit signal for generating a fault signal when the comparison falls without predetermined criteria.

4. The system of claim 3 including clock means and wherein said first, second and third means comprise shift registers, information being entered into said shift registers in serial-by-bit format in response to clock pulses generated by said clock means, the information in said shift registers being stored in parallel-by-bit format.

5. The system of claim 4 wherein said encoder means comprises a wafer switch having first and second redundant wafer sections, said parallel-by-bit signal being formulated individually in each wafer section by the particular alignment thereof, the alignment being chosen in accordance with said command.

6. The system of claim 5 wherein said first wafer section communicates directly with said first means whereby the parallel-by-bit signal formulated by said first wafer section is entered and stored in said first means.

7. The system of claim 5 wherein said first wafer section communicates parallel-by-bit with said first means whereby the parallel-by-bit signal formulated by said first wafer section is entered and stored in said first means.

8. The system of claims 6 or 7 wherein said second wafer section comprises encoder second means.

9. The system of claims 4, 5, 6 or 7 including a renewable timer reset to an initial value by said clock pulses and which counts down toward another value, said renewable timer generating a fault signal if it attains said another value.

10. A system for controlling a remote unit from a control unit in accordance with a command comprising:

means for converting said command into a parallel-by-bit digital signal;

a first shift register means responsive to said means for converting for storing a copy of said parallel-by-bit digital signal at said control unit and responsive to clock pulses applied thereto when in a first state to strobe a signal stored therein out in digital serial-by-bit format;

a second shift register means at said control unit and responsive to clock pulses for storing therein in parallel-by-bit format a serial-by-bit digital signal applied thereto;

a third shift register means at said remote unit and responsive to clock pulses for storing therein in parallel-by-bit format a serial-by-bit format digital signal applied thereto when in a first state and responsive to clock pulses when in a second state to strobe a signal stored therein out in digital serial-by-bit format; and, a programmer which periodically generates a burst of said clock pulses simultaneously with a signal of a first sense which triggers said first and third shift register means to said first state whereby the bursts of clock pulses strobes the signal stored in said first shift register means into said third shift register means, and wherein said programmer alternatively generates another burst of said clock pulses and a signal of a second sense which triggers said third shift register means to said second state whereby the burst of clock pulses strobes the signal stored in said third shift register means into said second shift register means, said first, second and third shift registers means being interconnected via a single information transfer line and the digital signal stored in said third shift register means controls the operation of said remote unit.

11. The system of claim 10 including second means for converting said command into a second parallel-by-bit signal and means comparing the second parallel-by-bit signal with the signal stored in said second shift register means, an unfavorable comparison being indicative of a fault in said system.

12. The system of claim 11 including a renewable timer reset to an initial value and counting toward another value, a fault being indicated if the renewable timer attains said another value.

13. The system of claim 11 or 12 wherein said second shift register means is connected to receive the signal strobed from said first shift register means.

* * * * *